(12) United States Patent
Wu

(10) Patent No.: US 9,964,821 B2
(45) Date of Patent: May 8, 2018

(54) CURVED LIQUID CRYSTAL DISPLAY PANEL

(71) Applicant: Shenzhen China Star Optoelectronics Technology Co., Ltd., Shenzhen (CN)

(72) Inventor: Chuan Wu, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 218 days.

(21) Appl. No.: 14/908,541

(22) PCT Filed: Dec. 28, 2015

(86) PCT No.: PCT/CN2015/099104
§ 371 (c)(1),
(2) Date: Jan. 29, 2016

(87) PCT Pub. No.: WO2017/059640
PCT Pub. Date: Apr. 13, 2017

(65) Prior Publication Data
US 2017/0255069 A1     Sep. 7, 2017

(30) Foreign Application Priority Data
Oct. 10, 2015     (CN) .......................... 2015 1 0654245

(51) Int. Cl.
*G02F 1/1362* (2006.01)
*G02F 1/1335* (2006.01)
(Continued)

(52) U.S. Cl.
CPC ...... *G02F 1/136209* (2013.01); *G02F 1/1368* (2013.01); *G02F 1/133345* (2013.01);
(Continued)

(58) Field of Classification Search
None
See application file for complete search history.

(56) References Cited

U.S. PATENT DOCUMENTS 9,547,199 B2 *  1/2017  Im ......................... G02F 1/1339
9,766,508 B2 *  9/2017  Ma ....................... G02F 1/1341
(Continued)

FOREIGN PATENT DOCUMENTS

CN          104347012 A       2/2015

*Primary Examiner* — Dennis Y Kim
(74) *Attorney, Agent, or Firm* — Leong C. Lei

(57) ABSTRACT

The present invention provides a curved liquid crystal display panel. In the curved liquid crystal display panel of the present invention, a TFT substrate is provided thereon with a black matrix corresponding to a trunk portion of a pixel electrode such that portions of the sub-pixels within two opposite side zones of the curved liquid crystal display panel that generate dark patterns and portions of the sub-pixels within a central zone of the curved liquid crystal display panel having the same width as that of the dark patterns are shielded, whereby through sacrifice of a portion of aperture ratio, the brightness of the curved liquid crystal display panel is made homogenized through all areas thereof thereby preventing brightness difference between the central zone and two opposite side zones of the curved liquid crystal display panel.

15 Claims, 6 Drawing Sheets

(51) Int. Cl.
*G02F 1/1333* (2006.01)
*G02F 1/1343* (2006.01)
*G02F 1/1368* (2006.01)

(52) U.S. Cl.
CPC .. *G02F 1/133512* (2013.01); *G02F 1/133514* (2013.01); *G02F 1/134309* (2013.01); *G02F 1/136286* (2013.01); *G02F 2001/134345* (2013.01); *G02F 2201/123* (2013.01); *G02F 2201/56* (2013.01)

(56) References Cited

U.S. PATENT DOCUMENTS

| | | | |
|---|---|---|---|
| 9,791,750 B2* | 10/2017 | Woo | G02F 1/13439 |
| 2014/0176856 A1* | 6/2014 | Lee | G02F 1/133305 |
| | | | 349/61 |
| 2015/0116625 A1* | 4/2015 | Hwang | G02F 1/136209 |
| | | | 349/57 |
| 2015/0362796 A1* | 12/2015 | Kong | G02F 1/136286 |
| | | | 349/106 |
| 2016/0041443 A1* | 2/2016 | Wu | G02F 1/136286 |
| | | | 349/43 |
| 2016/0195761 A1* | 7/2016 | Liu | G02F 1/133514 |
| | | | 257/88 |
| 2016/0282664 A1* | 9/2016 | Wu | G02F 1/133512 |

* cited by examiner

CURVED LIQUID CRYSTAL DISPLAY PANEL

BACKGROUND OF THE INVENTION

1. Field of the Invention

The present invention relates to the field of display technology, and in particular to a curved liquid crystal display panel.

2. The Related Arts

A liquid crystal display (LCD) comprises an enclosure, a liquid crystal panel arranged in the enclosure, and a backlight module mounted in the enclosure, wherein the liquid crystal panel is made up of a color filter (CF) substrate, a thin-film transistor (TFT) array substrate, and a liquid crystal layer filled between the two substrates. The CF substrate and the TFT substrate have surfaces opposing each other and provided with transparent electrodes. The liquid crystal display achieves control of the orientation of liquid crystal molecules by means of electric fields for the purposes of varying the state of polarization of light, and achieves transmission and blocking of light path by means of polarizers thereby realizing the object of displaying. With the progress of the display technology, people's demand for consumer electronic products are not limited to the respect of functionality and also turn into design and aesthetics as well as having excellent visual experience. Curved liquid crystal display devices, which are developed for such purposes, possess not only novel designs but also excellent visual experiences.

A curved liquid crystal panel is a core constituent component of the curved liquid crystal display device. The state-of-the-art process of manufacturing a curved liquid crystal panel is that a liquid crystal panel in the form of a flat panel is first made by laminating a CF substrate and a TFT substrate that have been formed in advance and are each in a planar form and then the flat panel like liquid crystal panel is acted upon by an external force to curve the liquid crystal panel that is in the form of a flat panel in such a way that the degree of curving (the radius of curvature) of the liquid crystal panel is determined according to the design size and observation distance thereof.

In a conventional vertical alignment (VA) display device, to improve the issue of color shifting associated with viewing angles, it is commonplace to divide a sub-pixel into a plurality of domains. The sub-pixel has a pixel unit that is generally in the form of a fish bone and an interfacing area between the domains is commonly referred to as an ITO (Indium Tin Oxide) trunk area.

As shown in FIG. 1, in a process of manufacturing a curved display device, after the formation of a curved surface, based on a reference set at a center of the panel, due to the upper and lower substrate will undergo relative shifting toward the left-hand side and right-hand side in a horizontal direction, the CF substrate 100 is subjected to stresses to slide toward the left-hand side and the right-hand side with respect to the TFT substrate 200. Consequently, the ITO trunk of the TFT substrate 200 will displace and the electric field established in a pixel unit varies, leading to darkening at a site of the curved display device that is close to the ITO trunk.

As shown in FIG. 2, when the CF substrate 100 moves rightward with respect to the TFT substrate 200, liquid crystal 300 on a portion rightward of the ITO trunk 210, namely that located in the area delimited by the rectangular frame, will undergo incorrect tilting direction and this would not recover, thereby forming dark patterns.

Due the amount of relative moment between the upper and lower substrates increasing in directions toward the opposite sides, no amount of relative movement is caused in a central zone of the liquid crystal panel. The sub-pixels in the central zone of the liquid crystal panel, the ITO trunk doe not shift, while the ITO trunks of the sub-pixels in the left side zone and the right side zone of the liquid crystal panel shift, thereby forming dark pattern zones. This leads to a significant difference of brightness between the central zone and the dark pattern zones and mura may result on the panel.

Thus, it is desired to provide a novel technique that overcomes the above problems.

SUMMARY OF THE INVENTION

An object of the present invention is to provide a curved liquid crystal display panel, in which a black matrix is provided on a thin-film transistor (TFT) substrate to correspond to a trunk portion of a pixel electrode in order to prevent brightness difference between a central zone and two opposite side zones in the curved liquid crystal display panel for homogenizing brightness of the panel.

To achieve the above object, the present invention provides a curved liquid crystal display panel, which comprises a TFT substrate, a CF substrate opposite to the TFT substrate, and a liquid crystal layer arranged between the TFT substrate and the CF substrate;

the TFT substrate comprising a first base plate, a first black matrix formed on the first base plate, a plurality of light-shielding metal frame formed on the first base plate and the first black matrix, an insulation layer formed on the first base plate and covering the plurality of light-shielding metal frame, and a plurality of data lines, a plurality of gate scan lines, and a pixel electrode layer formed on the insulation layer;

the plurality of data lines and the plurality of gate scan lines circumferentially delimiting and defining a plurality of sub-pixel zones, the plurality of light-shielding metal frame being respectively arranged in the plurality of sub-pixel zones, the pixel electrode layer comprising a pixel electrode corresponding to each of the sub-pixel zones, the pixel electrode comprising a multi-domain structure, the multi-domain structure comprising a trunk portion and branch portions, the first black matrix comprising a black light-shielding strip corresponding to each of the sub-pixel zones;

wherein in a planar state, the black light-shielding strip is located under the trunk portion of the pixel electrode and the black light-shielding strip has a width that is less than or equal to a width of the trunk portion;

wherein in a curved state, in two opposite side zones of the curved liquid crystal display panel, the CF substrate is sideways shifted with respect to the TFT substrate such that a dark pattern zone is generated at a location above one side of the trunk portion of the pixel electrode and the black light-shielding strip shields the dark pattern zone; and in a central zone of the curved liquid crystal display panel, the black light-shielding strip shields a portion of a normal zone having the same width as that of the dark pattern zone, whereby brightness of the curved liquid crystal display panel is made homogenized;

the CF substrate comprising second base plate and a color resist layer formed on the second base plate.

The light-shielding metal frame comprises a first light-shielding section located under the trunk portion and a second light-shielding section located on a circumference of the sub-pixel zone, the first light-shielding section having a width that is less than the width of the trunk portion.

The width of the black light-shielding strip is substantially equal to the width of the trunk portion.

In the planar state, the black light-shielding strip is located exactly under the trunk portion and two opposite ends of the black light-shielding strip are respectively in alignment with two ends of the trunk portion.

The width of the black light-shielding strip is less than the width of the trunk portion.

The curved liquid crystal display panel is divided into a left portion and a right portion according to a direction in which the CF substrate shifts with respect to the TFT substrate in the curved state;

wherein in the planar state, in the left portion of the liquid crystal display panel, in a vertical direction, a left end of the black light-shielding strip is in alignment with a left end of the first light-shielding section and a right end of the black light-shielding strip is in alignment with a right end of the trunk portion; and in the right portion of the liquid crystal display panel, in the vertical direction, a right end of the black light-shielding strip is in alignment with a right end of the first light-shielding section and a left end of the black light-shielding strip is in alignment with a left end of the trunk portion; and wherein in the curved state, in the left portion of the liquid crystal display panel, in the vertical direction, a left side portion of the black light-shielding strip shields the dark pattern zone, and in the right portion of the liquid crystal display panel, in the vertical direction, a right side portion of the black light-shielding strip shields the dark pattern zone.

The first base plate comprises a groove formed therein and the first black matrix is arranged in the groove.

The CF substrate further comprises a second black matrix formed on the second base plate and the second black matrix is arranged to correspond to edges of the sub-pixel zone.

The TFT substrate further comprises a second black matrix formed on the first base plate and the second black matrix and the first black matrix are formed through the same manufacturing process.

The first base plate comprises grooves formed therein and the first black matrix and the second black matrix are arranged in the grooves.

The present invention also provides a curved liquid crystal display panel, which is formed by curving a liquid crystal display panel, the liquid crystal display panel comprising a TFT substrate, a CF substrate opposite to the TFT substrate, and a liquid crystal layer arranged between the TFT substrate and the CF substrate;

the TFT substrate comprising a first base plate, a first black matrix formed on the first base plate, a plurality of light-shielding metal frame formed on the first base plate and the first black matrix, an insulation layer formed on the first base plate and covering the plurality of light-shielding metal frame, and a plurality of data lines, a plurality of gate scan lines, and a pixel electrode layer formed on the insulation layer;

the plurality of data lines and the plurality of gate scan lines circumferentially delimiting and defining a plurality of sub-pixel zones, the plurality of light-shielding metal frame being respectively arranged in the plurality of sub-pixel zones, the pixel electrode layer comprising a pixel electrode corresponding to each of the sub-pixel zones, the pixel electrode comprising a multi-domain structure, the multi-domain structure comprising a trunk portion and branch portions, the first black matrix comprising a black light-shielding strip corresponding to each of the sub-pixel zones;

wherein when the liquid crystal display panel is in a planar state, the black light-shielding strip is located under the trunk portion of the pixel electrode and the black light-shielding strip has a width that is less than or equal to a width of the trunk portion;

wherein when the liquid crystal display panel is in a curved state, in two opposite side zones of the curved liquid crystal display panel, the CF substrate is sideways shifted with respect to the TFT substrate such that a dark pattern zone is generated at a location above one side of the trunk portion of the pixel electrode and the black light-shielding strip shields the dark pattern zone; and in a central zone of the curved liquid crystal display panel, the black light-shielding strip shields a portion of a normal zone having the same width as that of the dark pattern zone, whereby brightness of the curved liquid crystal display panel is made homogenized;

the CF substrate comprising second base plate and a color resist layer formed on the second base plate;

wherein the light-shielding metal frame comprises a first light-shielding section located under the trunk portion and a second light-shielding section located on a circumference of the sub-pixel zone, the first light-shielding section having a width that is less than the width of the trunk portion;

wherein the width of the black light-shielding strip is substantially equal to the width of the trunk portion;

wherein in the planar state, the black light-shielding strip is located exactly under the trunk portion and two opposite ends of the black light-shielding strip are respectively in alignment with two ends of the trunk portion;

wherein the first base plate comprises a groove and the first black matrix is arranged in the groove.

The efficacy of the present invention is that the present invention provides a curved liquid crystal display panel, in which a black matrix is provided on the TFT substrate to correspond to a trunk portion of a pixel electrode such that portions of the sub-pixels within two opposite side zones of the curved liquid crystal display panel that generate dark patterns and portions of the sub-pixels within a central zone of the curved liquid crystal display panel having the same width as that of the dark patterns are shielded, whereby through sacrifice of a portion of aperture ratio, the brightness of the curved liquid crystal display panel is made homogenized through all areas thereof thereby preventing brightness difference between the central zone and two opposite side zones of the curved liquid crystal display panel.

BRIEF DESCRIPTION OF THE DRAWINGS

The technical solution, as well as other beneficial advantages, of the present invention will become apparent from the following detailed description of an embodiment of the present invention, with reference to the attached drawings.

In the drawings.

DETAILED DESCRIPTION OF THE PREFERRED EMBODIMENTS

Figure 1:
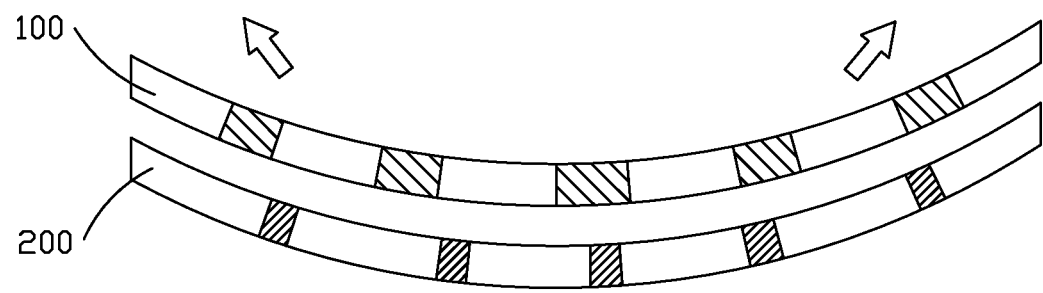
FIG. 1 is a schematic view illustrating relative shifting between a color filter (CF) substrate and a thin-film transistor (TFT) substrate of a conventional liquid crystal display panel.
Figure 2:
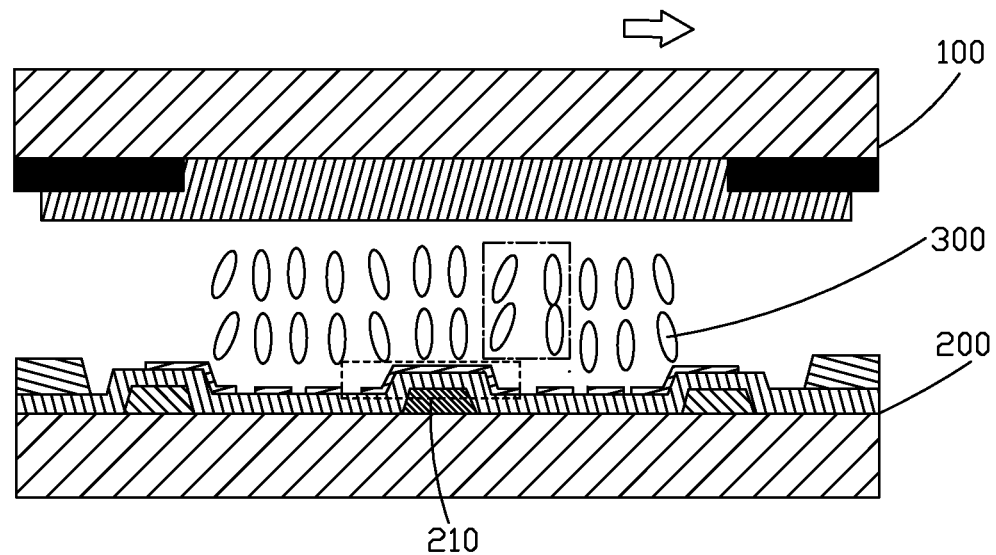
FIG. 2 is a cross-sectional view illustrating the structure of a conventional curved liquid crystal display panel.

To further expound the technical solution adopted in the present invention and the advantages thereof, a detailed description is given to a preferred embodiment of the present invention and the attached drawings.

Referring to FIGS. 3-11, the present invention provides a curved liquid crystal display panel, which comprises a thin-film transistor (TFT) substrate 1, a color filter (CF) substrate 2 opposite to the TFT substrate 1, and a liquid crystal layer 5 arranged between the TFT substrate 1 and the CF substrate 2.

The TFT substrate 1 comprises a first base plate 11, a first black matrix formed on the first base plate 11, a plurality of light-shielding metal frame 16 formed on the first base plate 11 and the first black matrix, an insulation layer 17 formed on the first base plate 11 and covering the plurality of light-shielding metal frame 16, and a plurality of data lines 13, a plurality of gate scan lines, and a pixel electrode layer formed on the insulation layer 17.

The plurality of data lines 13 and the plurality of gate scan lines circumferentially delimit and define a plurality of sub-pixel zones. The plurality of light-shielding metal frame 16 is respectively arranged in the plurality of sub-pixel zones. The pixel electrode layer comprises a pixel electrode 14 corresponding to each of the sub-pixel zones. The pixel electrode 14 comprises a multi-domain structure. The multi-domain structure comprises a trunk portion 141 and branch portions. The first black matrix comprises a black light-shielding strip 12 corresponding to each of the sub-pixel zones.

In a planar state, the black light-shielding strip 12 is located under the trunk portion 141 of the pixel electrode 14 and the black light-shielding strip 12 has a width that is less than or equal to a width of the trunk portion 141.

In a curved state, in two opposite side zones of the curved liquid crystal display panel, the CF substrate 2 is sideways shifted with respect to the TFT substrate 1 such that a dark pattern zone 91 is generated at a location above one side of the trunk portion 141 of the pixel electrode 14 and the black light-shielding strip 12 shields the dark pattern zone 91; and in a central zone of the curved liquid crystal display panel, the black light-shielding strip 12 shields a portion of a normal zone having the same width as that of the dark pattern zone 91, whereby brightness of the curved liquid crystal display panel is made homogenized.

The CF substrate 2 comprises a second base plate 21 and a color resist layer 22 formed on the second base plate 21.

Figure 3:
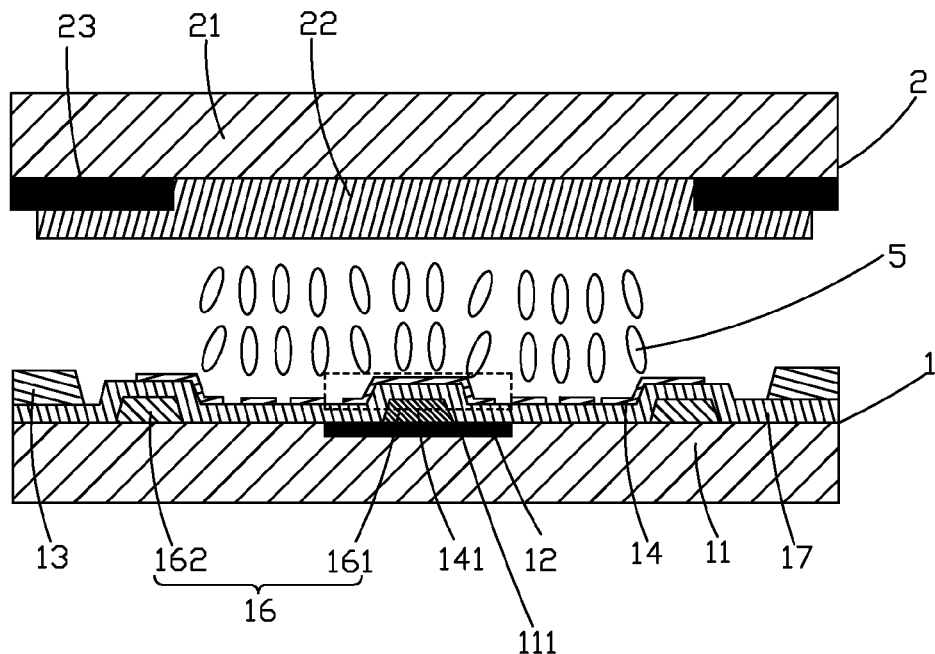
FIG. 3 is a cross-sectional view illustrating the structure of a curved liquid crystal display panel according to a first embodiment of the present invention in a planar state.
Figure 4:
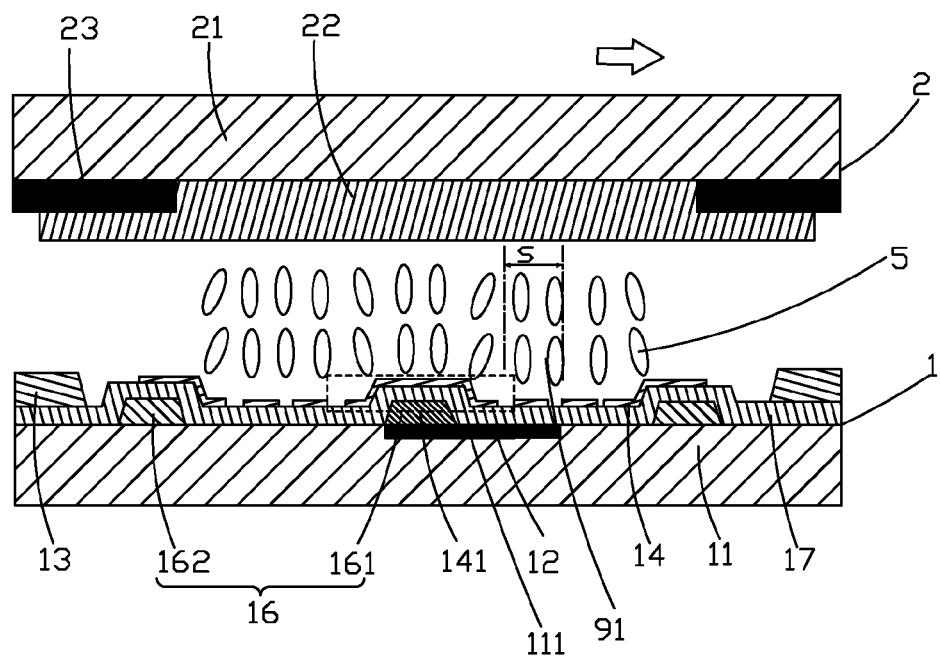
FIG. 4 is a cross-sectional view illustrating the structure of the curved liquid crystal display panel according to the first embodiment of the present invention in a curved state.
Figure 5:
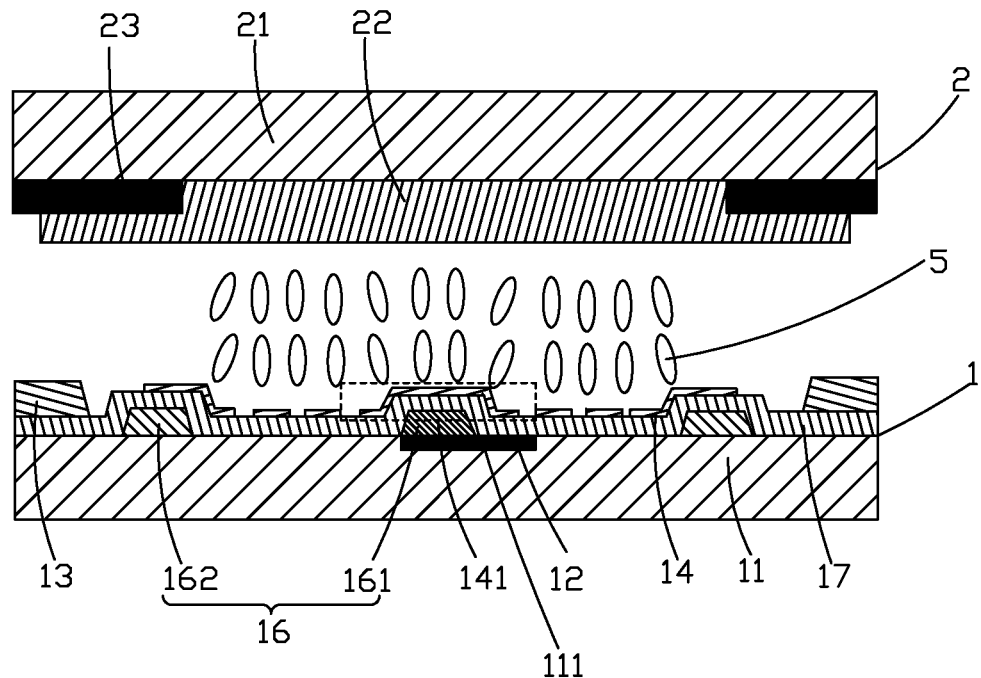
FIG. 5 is a cross-sectional view illustrating the structure of a left portion of a curved liquid crystal display panel according to a second embodiment of the present invention in a planar state.
Figure 6:
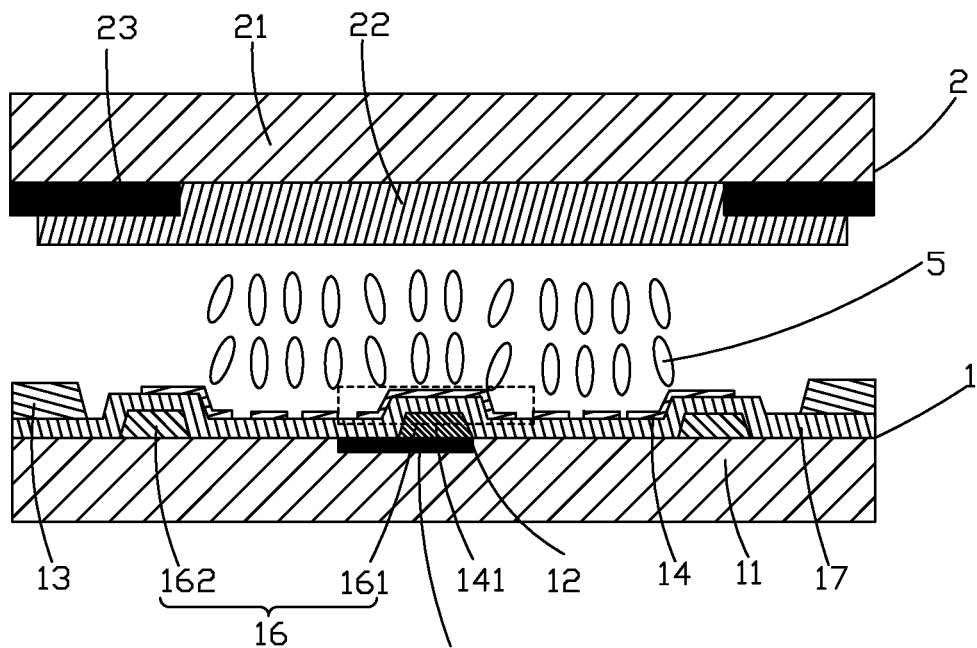
FIG. 6 is a cross-sectional view illustrating the structure of a right portion of the curved liquid crystal display panel according to the second embodiment of the present invention in a planar state.
Figure 7:
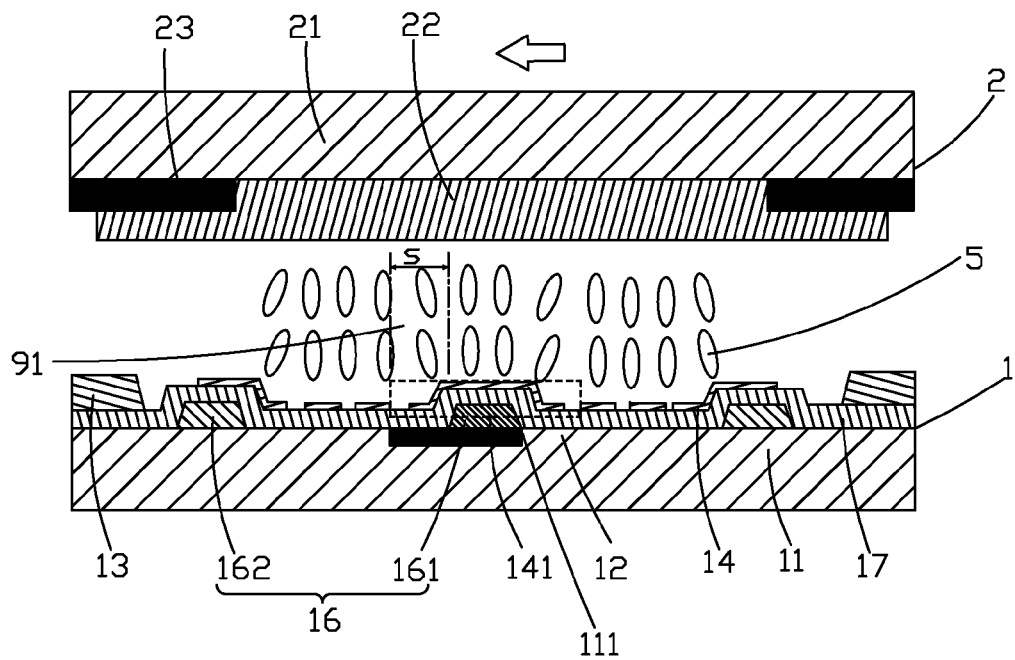
FIG. 7 is a cross-sectional view illustrating the structure of the left portion of the curved liquid crystal display panel according to the second embodiment of the present invention in a curved state.
Figure 8:
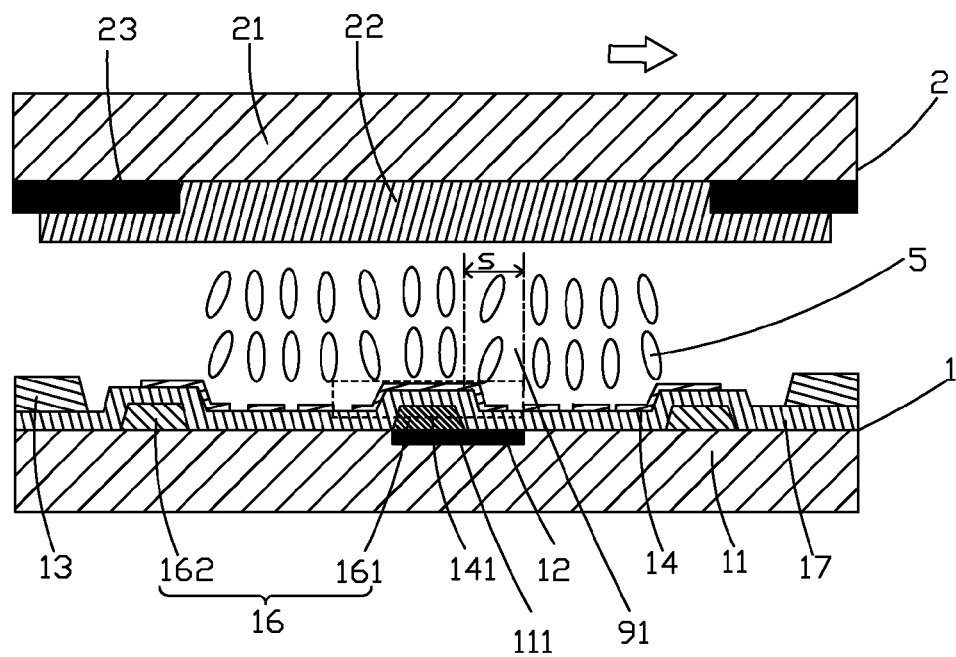
FIG. 8 is a cross-sectional view illustrating the structure of the right portion of the curved liquid crystal display panel according to the second embodiment of the present invention in a curved state.

Specifically, the light-shielding metal frame 16 comprises a first light-shielding section 161 located under the trunk portion 141 and a second light-shielding section 162 located on a circumference of the sub-pixel zone. The first light-shielding section 161 has a width that is less than the width of the trunk portion 141. Referring to FIGS. 3-4, a first embodiment of the curved liquid crystal display panel of the present invention is illustrated, in which the width of the black light-shielding strip 12 is substantially equal to the width of the trunk portion 141.

In the planar state, the black light-shielding strip 12 is located exactly under the trunk portion 141 and two opposite ends of the black light-shielding strip 12 are respectively aligned with two ends of the trunk portion 141; and in the curved state, the black light-shielding strip 12 shields the dark pattern zone 91.

In a process of manufacturing the curved liquid crystal display panel, after the curvature of the panel has been fixed, the amount of relative shifting between the upper and lower substrates at different areas can be obtained through empirical data and simulation, which allows for determination of the size of the dark pattern zone 91 in each area. Generally, the width S of the dark pattern zone 91 is slightly smaller than the amount of relative shifting. Thus, after the curvature of the panel is fixed, the amount of relative shifting of different areas can also be determined, meaning the direction of the dark pattern zone 91 can be determined. Thus, the compensation achieved with the first black matrix can be made in just one side according to the direction of relative shifting between the upper and lower substrates in order to increase aperture ratio.

Referring to FIGS. 5-8, a second embodiment of the curved liquid crystal display panel of the present invention is illustrated, in which the width of the black light-shielding strip 12 is less than the width of the trunk portion 141.

Based on the direction of relative shifting of the CF substrate 2 with respect to the TFT substrate 1 in a curved state, the curved liquid crystal display panel can be divided into two portions of left hand side and right hand side.

In a planar state, in the left portion of the liquid crystal display panel, in the vertical direction, a left end of the black light-shielding strip 12 is in alignment with a left end of the first light-shielding section 161 and a right end of the black light-shielding strip 12 is in alignment with a right end of the trunk portion 141; and in the right portion of the liquid crystal display panel, in the vertical direction, a right end of the black light-shielding strip 12 is in alignment with a right end of the first light-shielding section 161 and a left end of the black light-shielding strip 12 is in alignment with a left end of the trunk portion 141.

In a curved state, in the left portion of the liquid crystal display panel, in the vertical direction, a left side portion of the black light-shielding strip 12 shields the dark pattern zone 91, and in the right portion of the liquid crystal display panel, in the vertical direction, a right side portion of the black light-shielding strip 12 shields the dark pattern zone 91.

The first base plate 11 is provided with a groove 111 and the first black matrix is arranged in the groove 111.

Further, the present invention is applicable to a BOA (Black Matrix on Array) liquid crystal panel, and also a non-BOA one, meaning the curved liquid crystal display panel of the present invention further comprises a second black matrix 23 for preventing leakage of light at edges of the sub-pixel zones. The second black matrix 23 can be arranged on the CF substrate 2 and may also be arranged on the TFT substrate 1.

Figure 9:
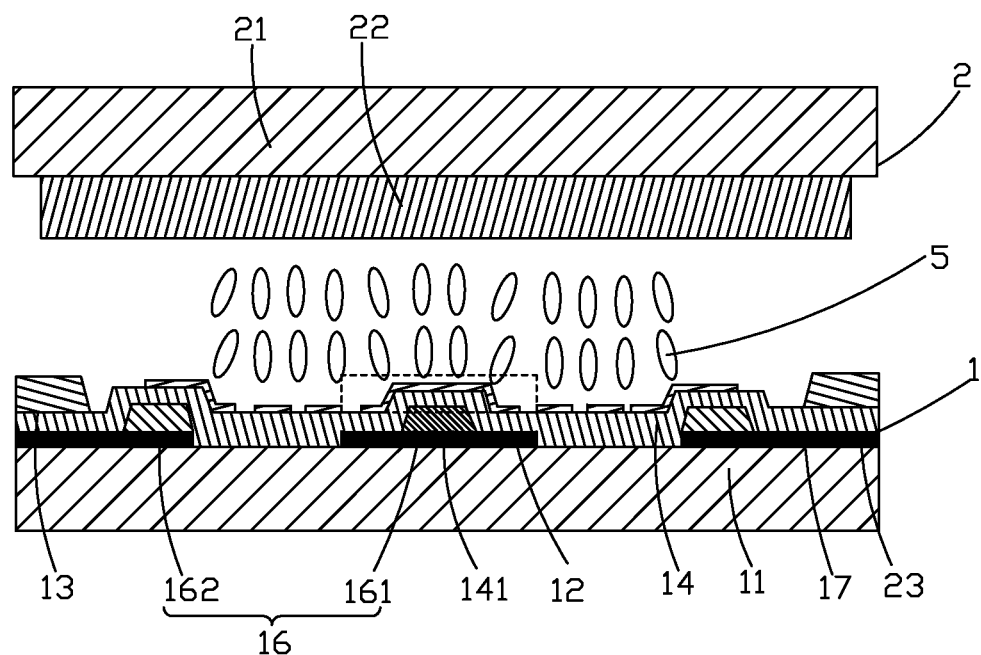
FIG. 9 is a cross-sectional view illustrating the structure of a curved liquid crystal display panel according to a third embodiment of the present invention in a planar state.
Figure 10:
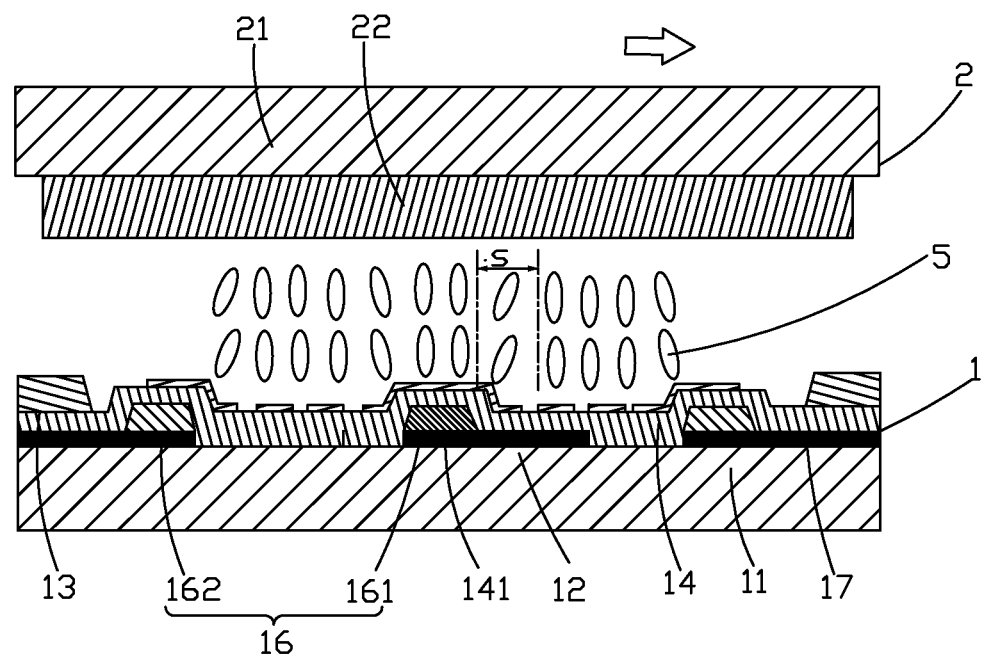
FIG. 10 is a cross-sectional view illustrating the structure of the curved liquid crystal display panel according to the third embodiment of the present invention in a curved state.

Referring to FIGS. 9-10, a third embodiment of the curved liquid crystal display panel of the present invention is illustrated. The TFT substrate further comprises a second black matrix 23 formed on the first base plate 11. The second black matrix 23 is formed in the same manufacturing process as that of the first black matrix. The second black matrix 23 and the first black matrix are both formed on a surface of the first base plate 11.

Figure 11:
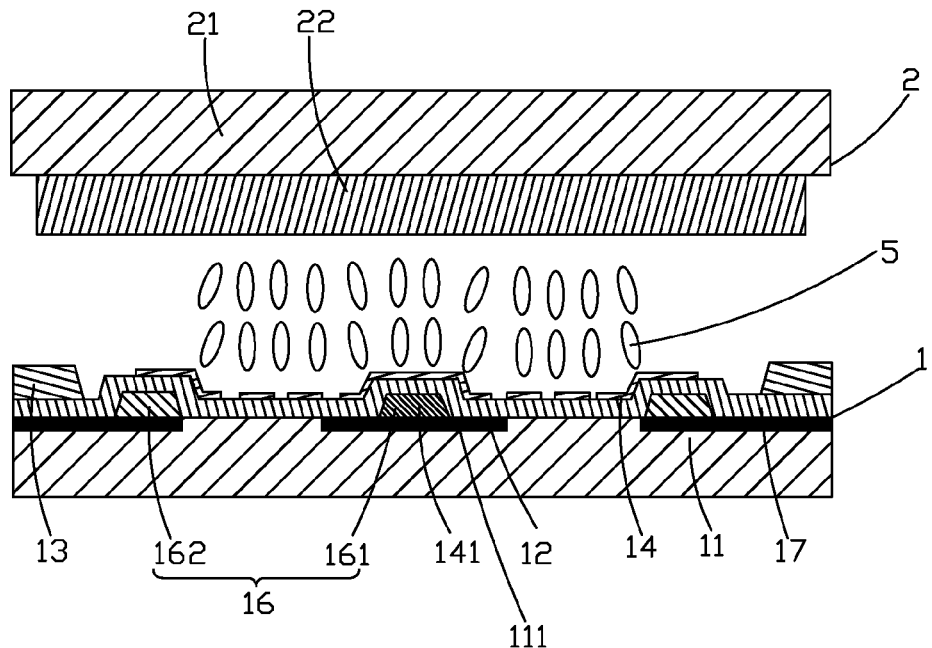
FIG. 11 is a cross-sectional view illustrating the structure of a curved liquid crystal display panel according to a fourth embodiment of the present invention in a planar state.
Figure 12:
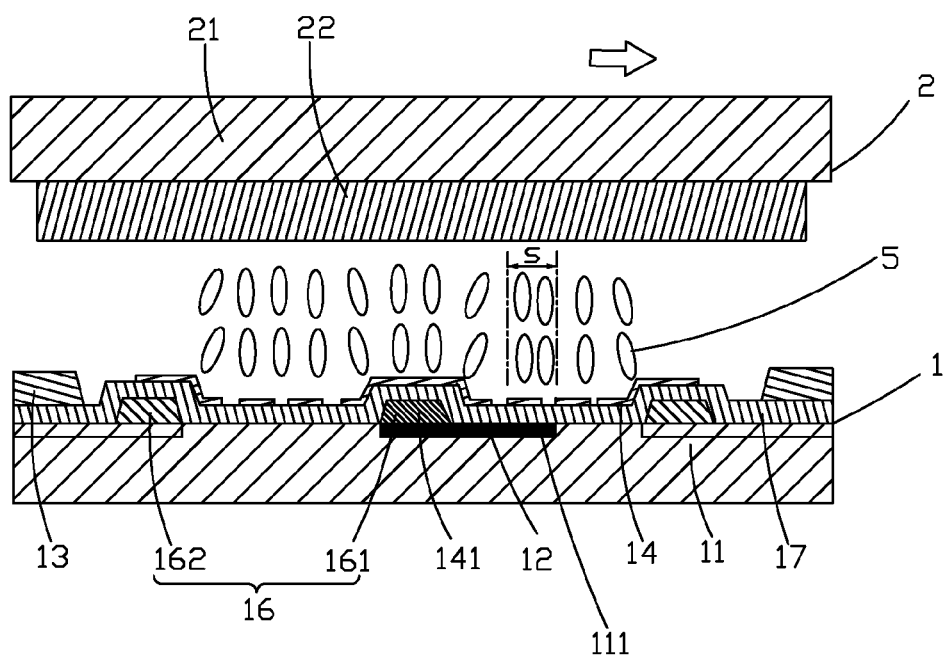
FIG. 12 is a cross-sectional view illustrating the structure of the curved liquid crystal display panel according to the fourth embodiment of the present invention in a curved state.

Referring to FIGS. 11-12, a fourth embodiment of the curved liquid crystal display panel of the present invention is illustrated, and is different from the third embodiment in that the first base plate 11 is provided with grooves 111 and the first black matrix and the second black matrix 23 are arranged in the grooves 111, the remaining being the same as that of the third embodiment so that repeated description is omitted herein.

In summary, the present invention provides a curved liquid crystal display panel, in which a black matrix is provided on the TFT substrate to correspond to a trunk portion of a pixel electrode such that portions of the sub-pixels within two opposite side zones of the curved liquid crystal display panel that generate dark patterns and portions of the sub-pixels within a central zone of the curved liquid crystal display panel having the same width as that of the dark patterns are shielded, whereby through sacrifice of a portion of aperture ratio, the brightness of the curved liquid crystal display panel is made homogenized through all areas thereof thereby preventing brightness difference between the central zone and two opposite side zones of the curved liquid crystal display panel.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A curved liquid crystal display panel, which is formed by curving a liquid crystal display panel, the liquid crystal display panel comprising a thin-film transistor (TFT) substrate, a color filter (CF) substrate opposite to the TFT substrate, and a liquid crystal layer arranged between the TFT substrate and the CF substrate;

the TFT substrate comprising a first base plate, a first black matrix formed on the first base plate, a light-shielding metal frame formed on the first base plate and the first black matrix, an insulation layer formed on the first base plate and covering the light-shielding metal frame, and a plurality of data lines, a plurality of gate scan lines, and a pixel electrode layer formed on the insulation layer;

the plurality of data lines and the plurality of gate scan lines circumferentially delimiting and defining a plurality of sub-pixel zones, the light-shielding metal frame being respectively arranged in the plurality of sub-pixel zones, the pixel electrode layer comprising a pixel electrode corresponding to each of the sub-pixel zones, the pixel electrode comprising a multi-domain structure, the multi-domain structure comprising a trunk portion and branch portions, the first black matrix comprising a black light-shielding strip corresponding to each of the sub-pixel zones;

wherein when the liquid crystal display panel is in a planar state, the black light-shielding strip is located under the trunk portion of the pixel electrode and the black light-shielding strip has a width that is less than or equal to a width of the trunk portion;

wherein when the liquid crystal display panel is in a curved state, in two opposite side zones of the curved liquid crystal display panel, the CF substrate is sideways shifted with respect to the TFT substrate such that a dark pattern zone is generated at a location above one side of the trunk portion of the pixel electrode and the black light-shielding strip shields the dark pattern zone; and in a central zone of the curved liquid crystal display panel, the black light-shielding strip shields a portion of a normal zone having the same width as that of the dark pattern zone, whereby brightness of the curved liquid crystal display panel is made homogenized;

the CF substrate comprising a second base plate and a color resist layer formed on the second base plate.

2. The curved liquid crystal display panel as claimed in claim 1, wherein the light-shielding metal frame comprises a first light-shielding section located under the trunk portion and a second light-shielding section located on a circumference of the sub-pixel zone, the first light-shielding section having a width that is less than the width of the trunk portion.

3. The curved liquid crystal display panel as claimed in claim 2, wherein the width of the black light-shielding strip is substantially equal to the width of the trunk portion.

4. The curved liquid crystal display panel as claimed in claim 3, wherein in the planar state, the black light-shielding strip is located exactly under the trunk portion and two opposite ends of the black light-shielding strip are respectively in alignment with two ends of the trunk portion.

5. The curved liquid crystal display panel as claimed in claim 3, wherein the first base plate comprises a groove formed therein and the first black matrix is arranged in the groove.

6. The curved liquid crystal display panel as claimed in claim 2, wherein the width of the black light-shielding strip is less than the width of the trunk portion.

7. The curved liquid crystal display panel as claimed in claim 6, wherein the curved liquid crystal display panel is divided into a left portion and a right portion according to a direction in which the CF substrate shifts with respect to the TFT substrate in the curved state;

wherein in the planar state, in the left portion of the liquid crystal display panel, in a vertical direction, a left end of the black light-shielding strip is in alignment with a left end of the first light-shielding section and a right end of the black light-shielding strip is in alignment with a right end of the trunk portion; and in the right portion of the liquid crystal display panel, in the vertical direction, a right end of the black light-shielding strip is in alignment with a right end of the first light-shielding section and a left end of the black light-shielding strip is in alignment with a left end of the trunk portion; and wherein in the curved state, in the left portion of the liquid crystal display panel, in the vertical direction, a left side portion of the black light-shielding strip shields the dark pattern zone, and in the right portion of the liquid crystal display panel, in the vertical direction, a right side portion of the black light-shielding strip shields the dark pattern zone.

8. The curved liquid crystal display panel as claimed in claim 6, wherein the first base plate comprises a groove formed therein and the first black matrix is arranged in the groove.

9. The curved liquid crystal display panel as claimed in claim 1, wherein the CF substrate further comprises a second black matrix formed on the second base plate and the second black matrix is arranged to correspond to edges of the sub-pixel zone.

10. The curved liquid crystal display panel as claimed in claim 1, wherein the TFT substrate further comprises a second black matrix formed on the first base plate and the second black matrix and the first black matrix are formed through the same manufacturing process.

11. The curved liquid crystal display panel as claimed in claim 10, wherein the first base plate comprises grooves formed therein and the first black matrix and the second black matrix are arranged in the grooves.

12. A curved liquid crystal display panel, which is formed by curving a liquid crystal display panel, the liquid crystal display panel comprising a thin-film transistor (TFT) substrate, a color filter (CF) substrate opposite to the TFT substrate, and a liquid crystal layer arranged between the TFT substrate and the CF substrate;
the TFT substrate comprising a first base plate, a first black matrix formed on the first base plate, a light-shielding metal frame formed on the first base plate and the first black matrix, an insulation layer formed on the first base plate and covering the light-shielding metal frame, and a plurality of data lines, a plurality of gate scan lines, and a pixel electrode layer formed on the insulation layer;
the plurality of data lines and the plurality of gate scan lines circumferentially delimiting and defining a plurality of sub-pixel zones, the light-shielding metal frame being respectively arranged in the plurality of sub-pixel zones, the pixel electrode layer comprising a pixel electrode corresponding to each of the sub-pixel zones, the pixel electrode comprising a multi-domain structure, the multi-domain structure comprising a trunk portion and branch portions, the first black matrix comprising a black light-shielding strip corresponding to each of the sub-pixel zones;
wherein when the liquid crystal display panel is in a planar state, the black light-shielding strip is located under the trunk portion of the pixel electrode and the black light-shielding strip has a width that is less than or equal to a width of the trunk portion;
wherein when the liquid crystal display panel is in a curved state, in two opposite side zones of the curved liquid crystal display panel, the CF substrate is sideways shifted with respect to the TFT substrate such that a dark pattern zone is generated at a location above one side of the trunk portion of the pixel electrode and the black light-shielding strip shields the dark pattern zone; and in a central zone of the curved liquid crystal display panel, the black light-shielding strip shields a portion of a normal zone having the same width as that of the dark pattern zone, whereby brightness of the curved liquid crystal display panel is made homogenized;
the CF substrate comprising a second base plate and a color resist layer formed on the second base plate;
wherein the light-shielding metal frame comprises a first light-shielding section located under the trunk portion and a second light-shielding section located on a circumference of the sub-pixel zone, the first light-shielding section having a width that is less than the width of the trunk portion;
wherein the width of the black light-shielding strip is substantially equal to the width of the trunk portion;
wherein in the planar state, the black light-shielding strip is located exactly under the trunk portion and two opposite ends of the black light-shielding strip are respectively in alignment with two ends of the trunk portion;
wherein the first base plate comprises a groove and the first black matrix is arranged in the groove.

13. The curved liquid crystal display panel as claimed in claim 12, wherein the CF substrate further comprises a second black matrix formed on the second base plate and the second black matrix is arranged to correspond to edges of the sub-pixel zone.

14. The curved liquid crystal display panel as claimed in claim 12, wherein the TFT substrate further comprises a second black matrix formed on the first base plate and the second black matrix and the first black matrix are formed through the same manufacturing process.

15. The curved liquid crystal display panel as claimed in claim 14, wherein the first base plate comprises grooves formed therein and the first black matrix and the second black matrix are arranged in the grooves.

* * * * *